2,775,201
Patented Dec. 25, 1956

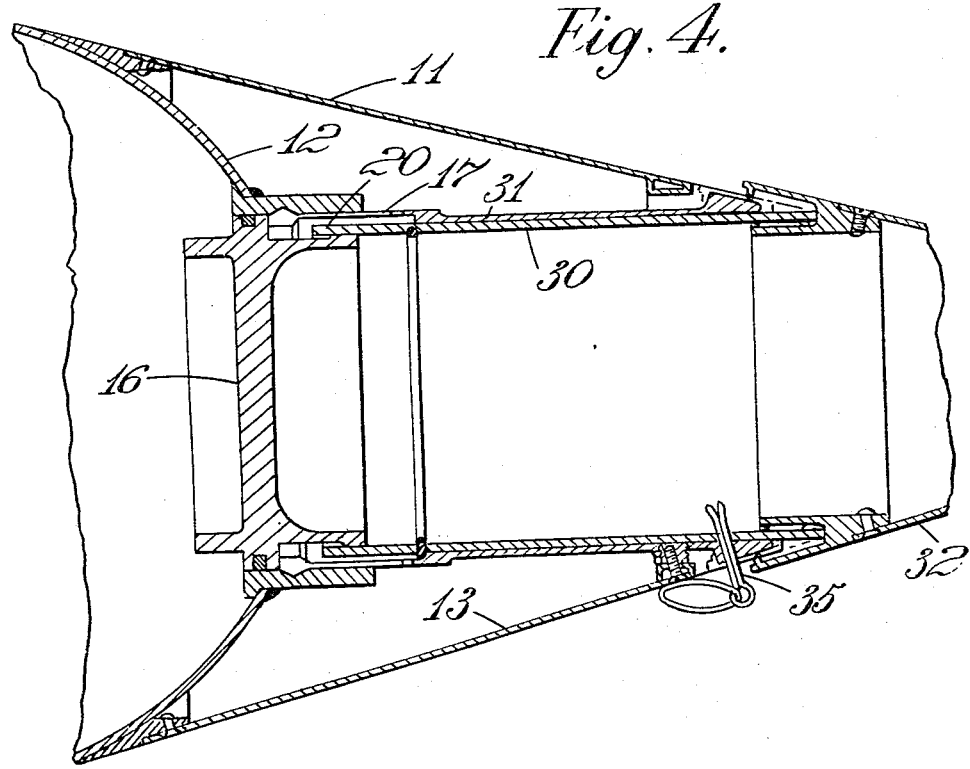

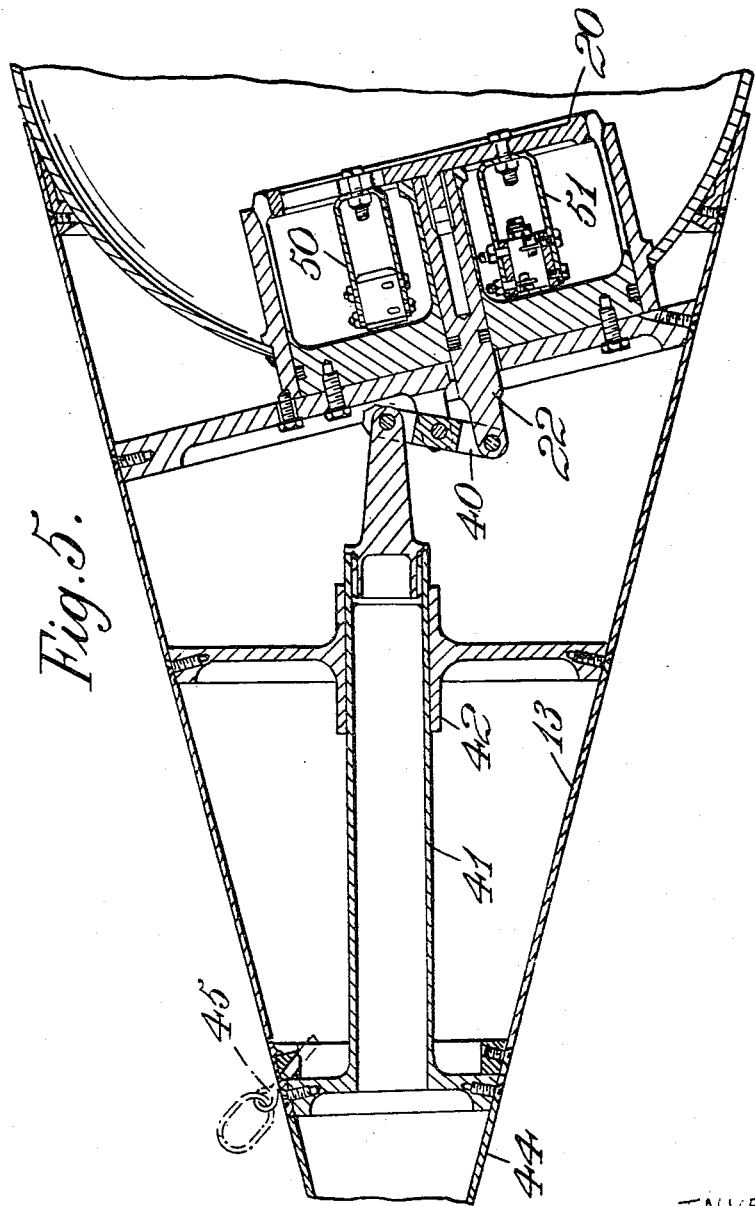

2,775,201

SAFETY DEVICES FOR APPARATUS CONTAINING STORED PRESSURE ENERGY

Hugh Graham Conway, Gloucester, England, assignor to British Messier Limited, Gloucester, England, a British company Application August 28, 1952, Serial No. 306,840

Claims priority, application Great Britain August 31, 1951

11 Claims. (Cl. 102—49)

This invention comprises improvements in or relating to safety devices for apparatus containing stored pressure energy. It is an object of the invention to provide a safety device for use in connection with projectiles, and in particular for guided weapons, which will ensure that in the event of unintentional or accidental ignition or release of a propulsive or explosive charge therein the resulting damage will be minimised as far as possible. The invention is not, however, limited to a projectile or guided missile as it is of value in connection with rocket power units for assisted take-off or with any other piece of apparatus which contains a large amount of stored energy capable of rapid release.

If a rocket or other self-propelled missile or like power-unit, whether guided or not, should accidentally become active in storage it becomes self-propulsive and may cause serious damage in the store. In order to obviate this danger it has been proposed to fit the end of a rocket tube which is remote from the propulsive venturi opening or nozzle therein, with a second plug capable of being blown out if the rocket becomes prematurely active. One known method of doing this is to fit a plug in the front end of the rocket by means of an interrupted-thread screw like the breech-screw of a gun, so that the plug on being partly rotated becomes free of the thread which holds it and is easily forced out of the front of the rocket. To hold the screwed plug from accidental displacement in the rocket when in this partly rotated position, it has been proposed to retain it by means of some easily rupturable material, such as a plastic substance, which forms a continuation of the metallic screw threads of the plug. The plastic substance, while adequate to resist hand pressure or a sudden jolt, is not strong enough to prevent the plug from being blown out of the end of the rocket in the event of the charge within the rocket becoming ignited. As the charge can then escape at both ends of the rocket it does not effect any propulsion. The interrupted metal screw thread, with plastic filling, does not however constitute an easily produced article and the present invention contemplates the provision of a superior alternative.

According to the present invention in a rocket or other device of the kind described, a safety plug is provided which can be blown out when in the storage position but is fast in the "armed" position, which plug is secured to the body of the rocket or the like by means of a spring-collet connection capable of yielding to permit withdrawal of the plug but of being locked by engagement with an annular face on a locking member movable longitudinally into or out of engagement with the collet. A suitable collet or locking member is of the construction described in United States Patent No. 2,221,979. In the aforesaid specification the locking member and collet are shown as applied to locking an operating jack for an undercarriage of an aircraft in a desired position, but in the present invention the parts are adapted to locking the plug in the end of the rocket or the like. Normally the collet enters a sleeve in the end of the rocket or the like and is carried upon a plug which fits the sleeve, the collet consisting of a crown of spring tongues supported around the periphery of the plug but each tongue having a head which can spring over an inclined locking face at the inner end of the part into which the plug fits. In this construction the annular member which engages the collet has to prevent the collet from collapsing under the effects of pressure within the rocket or the like and may be constituted by a slidable locking ring which is capable of entering the collet so as to lock it against collapse and withdrawal when the rocket or the like is "armed" but is moved out of the collet so as to permit the collapse of the same when the plug is to be left in a withdrawable position during storage.

The following is a description by way of example of one construction in accordance with the invention.

In the accompanying drawings:

Figure 4 is a longitudinal central section through a part of a projectile head incorporating a modified form of the invention; and Figure 5 is a view similar to Figures 1 and 2, showing a further modification.

Figure 1:
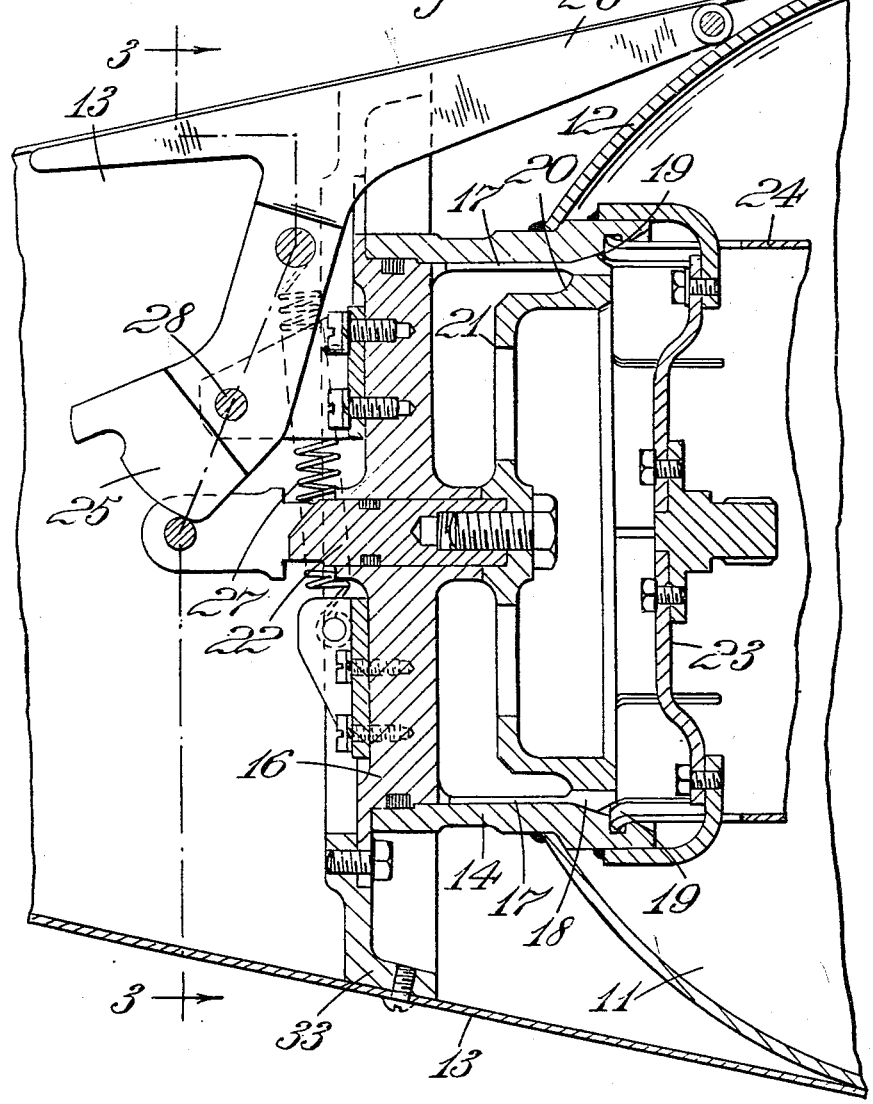
Figure 1 is a longitudinal central section through a part of the head of a projectile showing the arming device in armed position.
Figure 2:
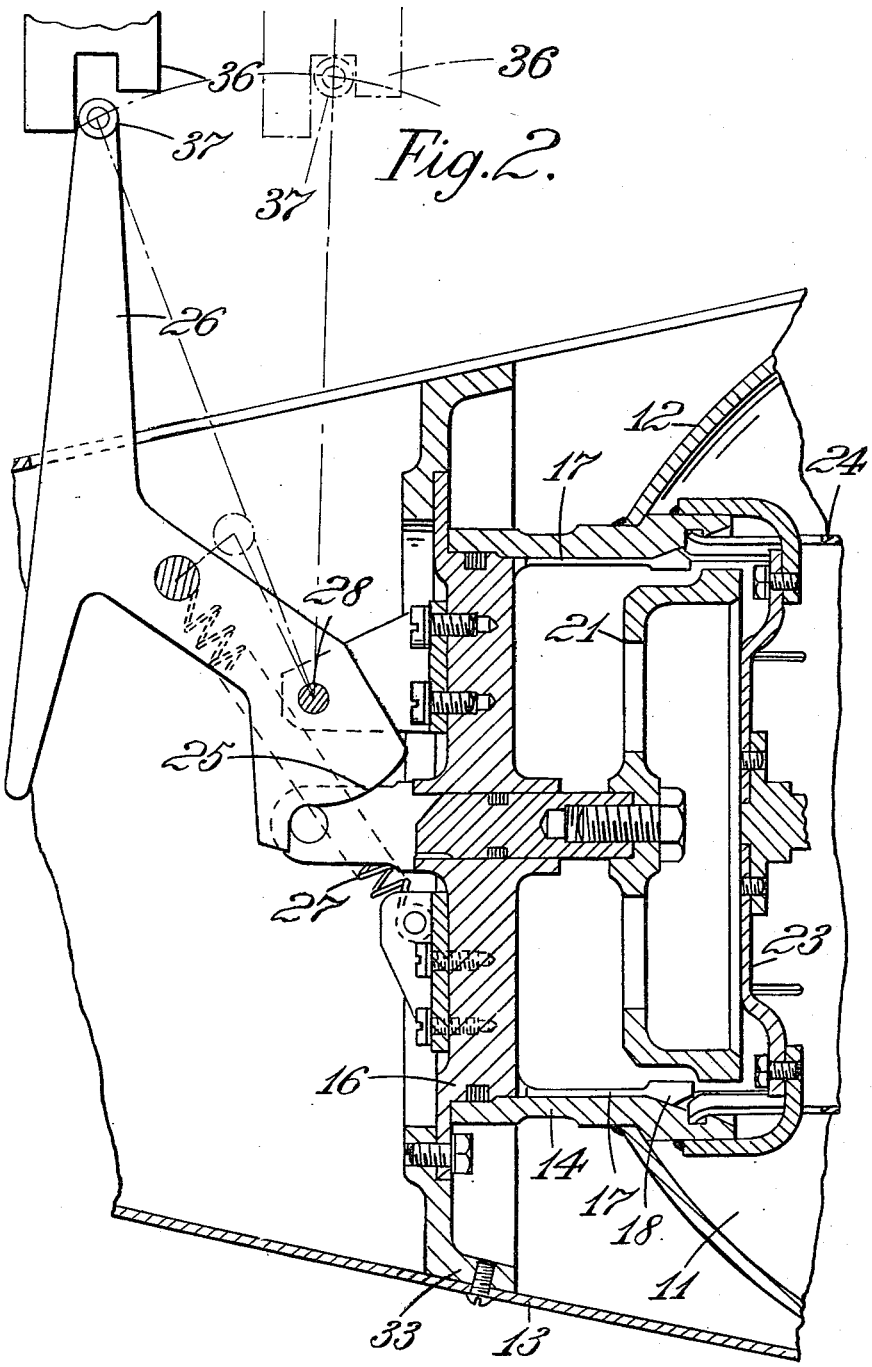
Figure 2 is a similar view showing the parts free.

The rocket comprises a substantially cylindrical main body or pressure chamber 11 having a hemispherical front end 12. In the pressure chamber is a propulsive charge. On the exterior of the hemispherical front end of the pressure chamber there is a conical nose 13 made of thin metal. Within the nose and welded to the hemispherical end of the pressure chamber is a large pressure release ring 14 having a bore which is co-axial with the pressure chamber. A steel plug 16 secured by a flange 33 to the conical head 13 fits the outer end of this opening and the plug is provided with a crown of flexible steel prongs or claws 17 (these extend all round the plug although only the top and bottom ones are shown) which pass through the cylindrical release ring 14 to the interior of the pressure chamber and here have heads 18 with inclined rear faces which overlap correspondingly inclined faces 19 on the inner end of the cylindrical ring 14. It is intended that, in the event of pressure developing in the pressure chamber 11, the plug 16 should be forced out of the opening in which it fits and carry away with it the conical head 13 to which it is secured. This the pressure can effect, provided the heads on the prongs 17, which constitute a collet-like assembly, are free to contract and allow the inclined overlapping faces of the heads 18 of the collet to slide out of engagement and the heads 18 to slide out of the ring 14. A locking member is provided in the form of a ring 20 which can fit inside the heads of the spring claws and so prevent them collapsing as shown in Figure 1. This ring is formed on the periphery of a disc 21 secured to and held centrally with the locking member by a sliding rod 22 which is supported in the plug 16 co-axially with the pressure chamber. As long as the ring 20 is within the collet heads 18 the plug 16 and conical head 13 are locked securely in place but if the ring 20 is moved out of contact with the backs of the heads 18 on the spring prongs 17 of the collet, as shown in Figure 2, the plug 16, and head 13, while not free to drop away, are nevertheless easily removed by internal pressure within the pressure chamber. The member 23 is a bridge to carry a fuse, and the member 24 is part of a shield for retaining the charge in place in the chamber 11. These parts do not obstruct the free release of the pressure when the plug 16 is blown out.

Figure 3:
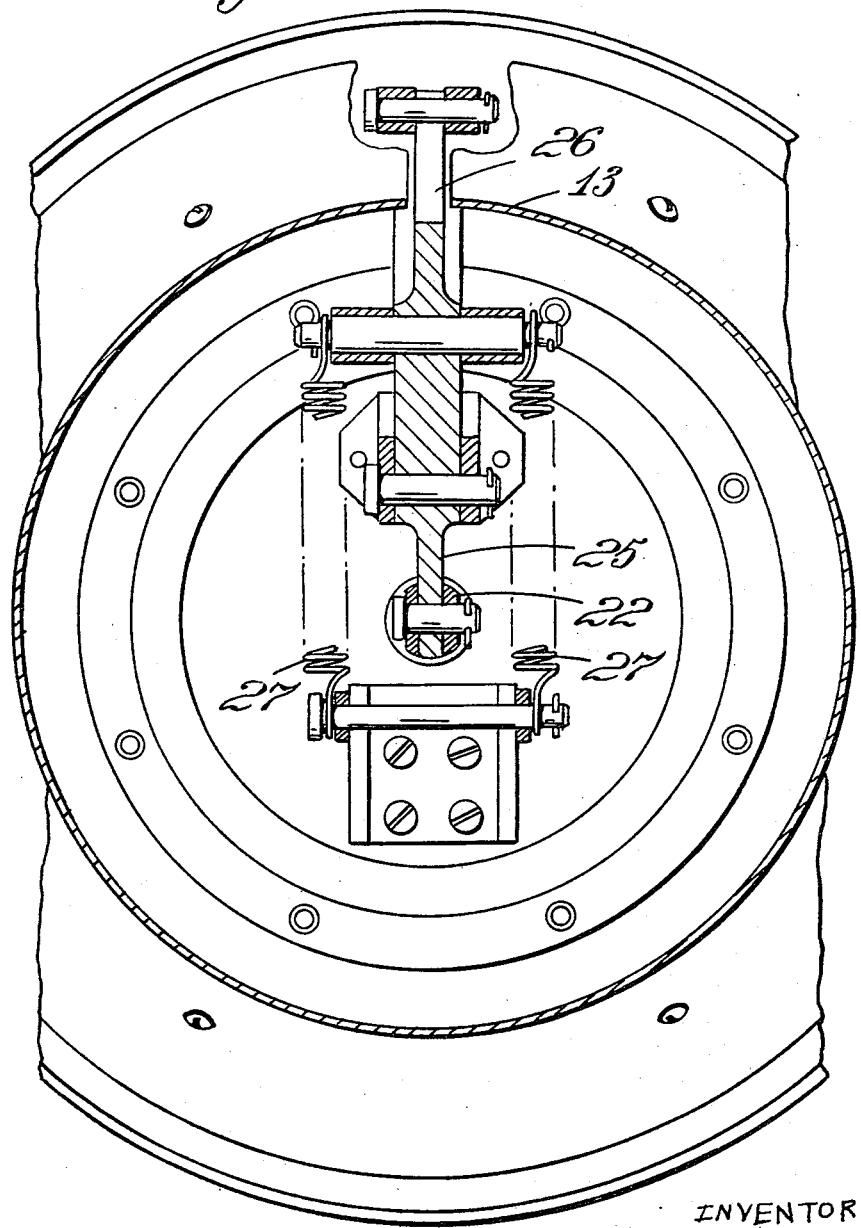
Figure 3 is a cross section upon the line 3—3 of Figure 1, looking in the direction of the arrows.

The sliding spindle 22 which carries the locking ring 20 is connected to a suitable mechanism within the conical head 13 of the missile so that it can at will be moved into the position in which it locks the plug in place (the "armed" position as shown in Figure 1) or into the position in which it is out of contact with the spring arms of the collet and the plug is easily removable (the "storage" position as shown in Figure 2). The release mechanism may be of any one of several different kinds:

In the illustrated construction (Figures 1–3) the locking ring 20, instead of being held in place by a toggle, is moved into or out of the locking position by a cam 25 pivoted in the conical head of the projectile and formed in one piece with a release trigger 26. A spring 27 tends to hold the cam trigger in the "armed" position but the centre line of the spring is so chosen that it crosses the axis of the cam pivot 28 when the trigger is pulled outwards and therefore tends, when the device is moved to the safety position, to hold the trigger open as shown in Figure 2. The trigger 26 in the "armed" position lies flush with the sides of the conical head but in the "storage" position is pulled outward. Thus, it affords an easy visual indication of whether the rocket is "armed" or not. It will be understood that the conical head 13 of the projectile is detached from the body 12 when the plug 16 is blown off, so as not to resist the pressure generated in the container. The conical head does not have to withstand any pressure when the plug 16 is locked, which occurs when the trigger 26 is pressed into the "armed" position shown in Figure 1.

As shown in Figure 2, it is possible to arrange a fixed catch 36 in the path of a roller 37 on the end of the trigger 26. This may, for example, be done on a launching platform in such a manner that as the rocket is pushed forward into firing position on the platform, the trigger is automatically moved part of the way rearward. In Figure 2 of the drawing there is shown in chain lines the relative position of the parts 37 and 36 when the trigger 26 has been moved part of the way rearward. At this time it will be seen that the roller 37 has entered the slot of the fixed catch 36. If the rocket is now withdrawn by being moved to the right, as shown in Figure 2, the trigger 26 will be retained by the catch 36 from movement with the rocket. In other words, relatively to the rocket the trigger will move forward again to the position shown in full lines in the drawing, that is, the catch 36 will have restored it to the unarmed or storage position. The spring 27 insures that the movement is completed in the position shown by the chain line. The pivot to which spring 27 is attached has not quite reached the dead center where it is in line with pivot 28, but when the rocket is fired the longer arm of the catch 36 swings the trigger 26 further backward so that the spring 27 passes the dead center and pulls the trigger 26 over into the fully armed position shown in Figure 1.

In another construction (Figure 4) the locking ring 20 is formed on a hollow sleeve 30 coaxial with the projectile and with a second sleeve 31 outside it which carries the collet prongs 17. It is movable longitudinally relatively to the collet prongs 17 and is secured to a nose-tip 32 of the projectile which is separate from the main part 13 of the conical front end thereof. If the nose-tip 32 is pushed in, the locking ring 20 is carried into locking position and the projectile is armed. If the nose-tip 32 is pulled out the parts are unlocked for storage. The nose is therefore normally out and it is held in this position by a split pin 35 passing through the sleeve 31 which carries the locking claws and the inner sleeve 30 which carries the locking ring. On withdrawing the split pin the nose can be pushed home and the parts become "armed."

In a fourth construction (Figure 5) the locking ring 20 is connected by means of its central stem 22 and a rocking lever 40 to a longitudinally slidable member 41 within the conical front end 13 of the projectile. The longitudinally slidable member 41 slides through an arming guide 42 supported in the conical head 13. The member 41 carries the nose 44 of the projectile which is separate from the main portion 13 of the conical head but connected thereto by a split pin 45. On withdrawing the split pin 45 the nose can be moved outwards to operate the rocking lever 40 and unlock the locking ring 20.

Micro-switches 50, 51 carried by the locking ring may be used so that they are operated when the parts move into or out of the "armed" position, and these micro-switches may serve to set in action any of the other mechanisms of the rocket if desired.

I claim:

1. In a rocket or other self-propelled missile or like power unit comprising a pressure chamber, a pressure release sleeve fixed in said pressure chamber, a safety plug positioned and adapted to close off the distal end of said sleeve, a spring collet connection between said sleeve and plug capable of yielding to permit displacement of the plug, and an annular member movable into engagement with said collet, when desired, to prevent said collet from yielding as aforesaid to permit displacement of said plug.

2. A power unit as claimed in claim 1 wherein the collet enters said sleeve in the end of the rocket or the like and is carried upon said safety plug which fits the sleeve, the collet consisting of a crown of spring tongues supported around the periphery of the plug with each tongue having a head which can spring over an inclined locking face at the inner end of the sleeve into which the plug fits.

3. A power unit as claimed in claim 2 wherein the annular member which engages the collet is constituted by a slidable locking ring which is capable of entering the collet so as to lock it against collapse and withdrawal when the rocket or the like is "armed" but is moved out of the collet so as to permit the collapse of the same when the plug is to be left in a withdrawable position during storage.

4. A power unit as claimed in claim 1 wherein the front of the pressure chamber comprises and is protected with a pointed nose and the nose is secured to the plug so as to be detachable therewith from the projectile.

5. A power unit as claimed in claim 1 wherein the collet and locking member are within the plug, inside the pressure chamber including a mechanism outside the pressure chamber and a sliding rod passing through said plug and connecting said collet and said locking member to said mechanism for moving the locking member.

6. A power unit as claimed in claim 5 including a cam engaging member carried by said sliding rod, an arming trigger pivoted on said plug, and a cam carried by said trigger to operate the sliding rod.

7. A power unit as claimed in claim 6 wherein the trigger is pivoted inside the nose of the missile and provided with means to hold it yieldingly in the "armed" and "unarmed" positions.

8. A power unit as claimed in claim 1 wherein a pointed nose is fixed on the front of said pressure chamber, and means carried by said nose for movement axially relatively to the remainder of the projectile and serves by said axial movement to operate the locking member.

9. A power unit as claimed in claim 8 including a sleeve connecting said means to the locking member, said sleeve being coaxial with the nose, and the locking member being directly mounted on said sleeve.

10. A power unit as claimed in claim 8 wherein said means which operates the locking member includes a lever interconnecting said means and said locking member.

11. A power unit as claimed in claim 1 wherein the locking device is provided with electrical switch means operable by the locking of the device to permit or ensure the operation of other parts of the missile.

References Cited in the file of this patent

FOREIGN PATENTS 612,998     Great Britain _____ Nov. 19, 1948